United States Patent
Zhou et al.

(10) Patent No.: US 12,038,526 B2
(45) Date of Patent: Jul. 16, 2024

(54) RADAR DEVICE AND MOBILE PLATFORM

(71) Applicant: SZ DJI TECHNOLOGY CO., LTD., Shenzhen (CN)

(72) Inventors: Wanren Zhou, Shenzhen (CN); Chunming Wang, Shenzhen (CN); Di Gao, Shenzhen (CN); Wenkang Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 10 days.

(21) Appl. No.: 17/707,904

(22) Filed: Mar. 29, 2022

(65) Prior Publication Data

US 2022/0221555 A1 Jul. 14, 2022

Related U.S. Application Data

(63) Continuation of application No. PCT/CN2019/109506, filed on Sep. 30, 2019.

(51) Int. Cl.
*G01S 7/03* (2006.01)
*G01S 13/88* (2006.01)
(Continued)

(52) U.S. Cl.
CPC .............. *G01S 7/03* (2013.01); *G01S 13/881* (2013.01); *H01Q 1/247* (2013.01);
(Continued)

(58) Field of Classification Search
CPC . G01S 7/03; G01S 13/881; G01S 7/02; G01S 7/027; G01S 7/028; G01S 13/931;
(Continued)

(56) References Cited

U.S. PATENT DOCUMENTS

| 8,013,779 B2 * | 9/2011 | Maurel | H01Q 1/282 343/705 |
| 2018/0074519 A1 * | 3/2018 | Qin | H04N 23/51 |

FOREIGN PATENT DOCUMENTS

| CN | 206926813 U | 1/2018 |
| CN | 207587952 U * | 7/2018 |

(Continued)

OTHER PUBLICATIONS

JP2019110729A_Description_20230404_1541.pdf (JP2019110729A translate) (Year: 2019).*

(Continued)

*Primary Examiner* — Olumide Ajibade Akonai
*Assistant Examiner* — Yonghong Li
(74) *Attorney, Agent, or Firm* — ANOVA LAW GROUP, PLLC

(57) ABSTRACT

A radar device includes a radar base and a radar module. The radar module is mounted at the radar base and configured to rotate relative to the radar base around a rotation axis. The radar module includes an antenna assembly, a signal processing circuit board, and a rotation installation base. The antenna assembly and the signal processing circuit board are arranged oppositely at an interval and jointly enclose to form an accommodation space. The rotation installation base is connected to the antenna assembly and the signal processing circuit board and is located in the accommodation space. The radar base is at least partially located in the accommodation space and arranged opposite to the rotation installation base.

19 Claims, 5 Drawing Sheets

(51) Int. Cl.
 *H01Q 1/24* (2006.01)
 *H01Q 1/32* (2006.01)
 *H02K 7/00* (2006.01)
 *H02K 1/22* (2006.01)

(52) U.S. Cl.
 CPC ........... *H01Q 1/3233* (2013.01); *H02K 7/003* (2013.01); *H02K 1/22* (2013.01)

(58) Field of Classification Search
 CPC .... G01S 13/933; H01Q 1/247; H01Q 1/3233; H01Q 1/38; H01Q 1/42; H01Q 3/04; H01Q 7/06; H02K 7/003; H02K 1/22; H02K 7/14; H02K 1/12; H02K 11/0094; B64C 39/024; B64U 2101/00
 See application file for complete search history.

(56) References Cited

FOREIGN PATENT DOCUMENTS

| | | | | |
|---|---|---|---|---|
| CN | 108513621 | A * | 9/2018 | ............... B64C 1/36 |
| CN | 108513621 | A | 9/2018 | |
| CN | 108700657 | A | 10/2018 | |
| CN | 108885248 | A | 11/2018 | |
| CN | 209071604 | U | 7/2019 | |
| DE | 202018102708 | U1 * | 10/2018 | ............... G01S 7/03 |
| EP | 2172788 | A1 | 4/2010 | |
| JP | 2017020902 | A * | 1/2017 | ............... G01S 7/03 |
| JP | 2019110729 | A * | 7/2019 | ............. H02J 50/70 |
| WO | 2019119230 | A1 | 6/2019 | |
| WO | WO-2019119230 | A1 * | 6/2019 | ............. H01Q 1/00 |

OTHER PUBLICATIONS

DE202018102708U1_translate.pdf (DE202018102708 translate) (Year: 2018).*
WO2019119230A1_translate.pdf (WO2019/119230 translate) (Year: 2019).*
CN108513621_A_I_translate.pdf (CN108513621 translate) (Year: 2018).*
JP2017020902A—Rotary joint and radar system—Google Patents.pdf—JP2017020902A translate (Year: 2017).*
CN207587952U_Description_20230808_1110.pdf—translation of CN207587952U (Year: 2018).*
The World Intellectual Property Organization (WIPO) International Search Report for PCT/CN2019/109506 Jun. 28, 2020 6 Pages (including translation).

* cited by examiner

RADAR DEVICE AND MOBILE PLATFORM

CROSS-REFERENCE TO RELATED APPLICATION

This application is a continuation of International Application No. PCT/CN2019/109506, filed Sep. 30, 2019, the entire contents of which is incorporated herein by reference.

TECHNICAL FIELD

The present disclosure generally relates to the radar structure technology field and, more particularly, to a radar device and a mobile platform.

BACKGROUND

With the development of science and technology, more and more automation apparatuses are used more and more widely. For example, a radar can be applied in the detection and ranging application fields of unmanned aerial vehicles (UAVs), automobiles, and other industries. The radar is usually configured to detect and perceive obstacles of a surrounding area to effectively avoid the obstacles.

However, the radar in the existing technology is generally large and heavy and is not suitable to be applied on a small platform. For example, when being applied to a UAV, the vertical size of the radar is relatively large, which increases the vertical height of the UAV. When the vertical height of the UAV is too high, the flight stability of the UAV will be affected. Moreover, the higher the vertical height of the radar is, the larger a radar cover covering the radar is, and the heavier the weight is, which does not meet a requirement of lightweight.

SUMMARY

Embodiments of the present disclosure provide a radar device, including a radar base and a radar module. The radar module is mounted at the radar base and configured to rotate relative to the radar base around a rotation axis. The radar module includes an antenna assembly, a signal processing circuit board, and a rotation installation base. The antenna assembly and the signal processing circuit board are arranged oppositely at an interval and jointly enclose to form an accommodation space. The rotation installation base is connected to the antenna assembly and the signal processing circuit board and is located in the accommodation space. The radar base is at least partially located in the accommodation space and arranged opposite to the rotation installation base.

The present disclosure provides a radar device and a mobile platform, including a radar base and a radar module. The radar module is rotatably mounted at the radar base. The radar module includes an antenna assembly and a signal processing circuit board arranged at an interval. The antenna assembly and the signal processing circuit board jointly enclose to form an accommodation space. The rotation installation base is connected to the antenna assembly and the signal processing circuit board and located in the accommodation space. The radar base is at least partially located in the accommodation space and arranged opposite to the rotation installation base. By designing a structure with the antenna assembly and the signal processing circuit board of the radar module arranged oppositely at an interval on two sides and accommodating the radar base at least partially in the accommodation space of the radar module, a vertical space may be effectively saved, and an overall size of the radar device and an overall weight of the radar device may be reduced.

BRIEF DESCRIPTION OF THE DRAWINGS

In order to explain the technical solutions of embodiments of the present disclosure more clearly, the drawings needed for describing embodiments will be briefly introduced. Apparently, the drawings in the following description are some embodiments of the present disclosure. For those of ordinary skill in the art, other drawings may be obtained from these drawings without any creative effort.

DETAILED DESCRIPTION OF THE EMBODIMENTS

Figure 1:
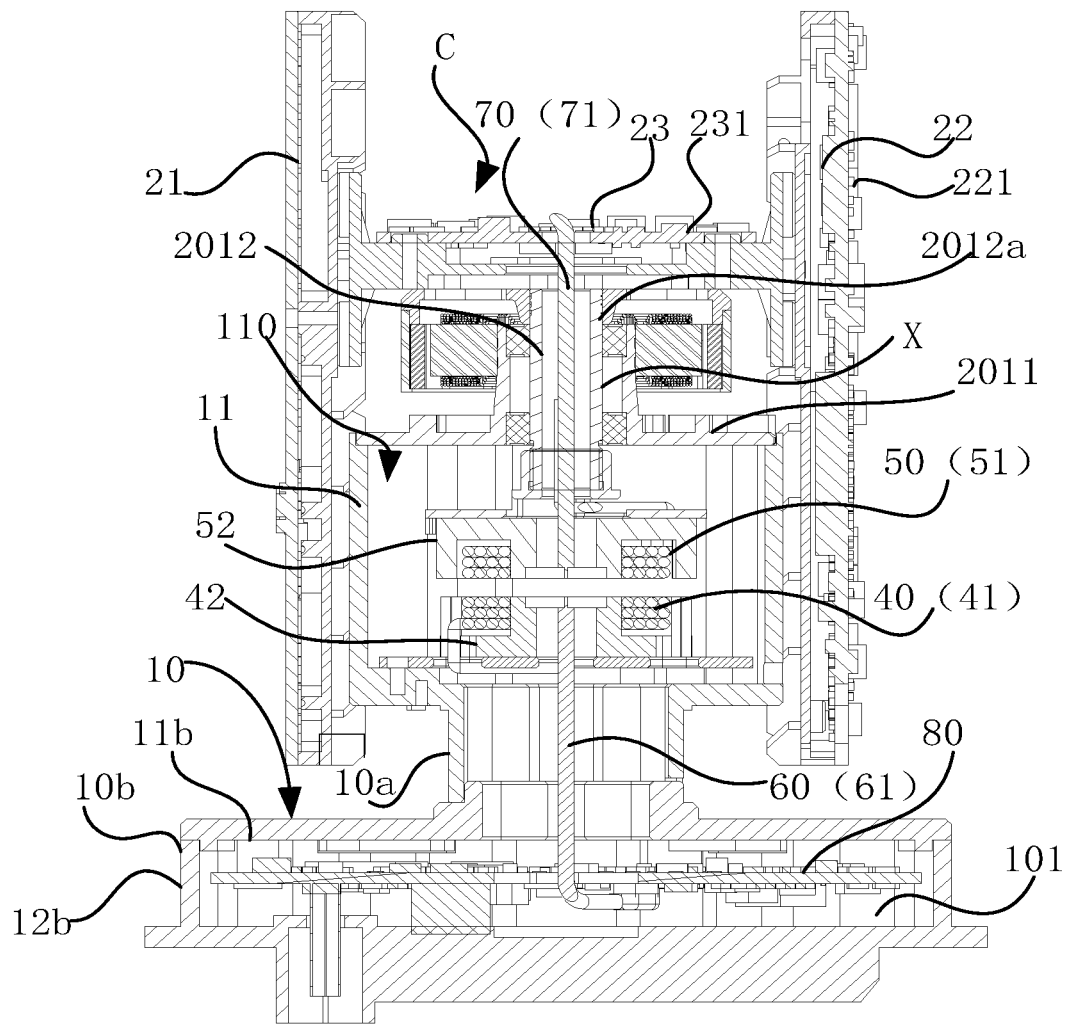
FIG. 1 is a schematic cross-sectional structural diagram of a radar device according to some embodiments of the present disclosure.

The technical solutions of embodiments of the present disclosure are described in detail with reference to the accompanying drawings of embodiments of the present disclosure. Apparently, described embodiments are only some embodiments of the present disclosure rather than all embodiments. Based on embodiments of the present disclosure, all other embodiments obtained by those of ordinary skill in the art without any creative effort should be within the scope of the present disclosure.

Unless otherwise defined, all technical and scientific terms used herein have the same meaning as commonly understood by those skilled in the art of the present disclosure. The terms used in the specification of the present disclosure are only for the purpose of describing specific embodiments and are not intended to limit the present disclosure.

The term "including" mentioned in the entire specification and claims is an open term, so the term should be interpreted as "including but not limited to." "Approximately" means that within an acceptable error range, those skilled in the art can solve the technical problem within a certain error range to basically achieve the technical effect.

In addition, the term "connected" herein includes any direct and indirect connection. Therefore, if in the text a first device is connected to a second device, it means that the first device can be directly connected to the second device or indirectly connected to the second device through another device.

The term "and/or" used in the specification is only an association relationship describing associated objects, which means that three relationships may exist. For example, A1 and/or B1 may include three cases that A1 exists alone, A1 and B1 exist at the same time, and B1 exists alone. In addition, the sign "/" in the specification generally indicates that the associated objects before and after are in an "or" relationship.

Some embodiments of the present disclosure are described in detail with reference to the accompanying drawings. Where there is no conflict with each other, those skilled in the art can combine and group different embodiments or examples and features of different embodiments or examples described in the specification. In some embodiments, the radar device may emit a detection wave. When the detection wave encounters an obstacle, the detection wave may be reflected and return. The radar device may receive an echo signal to sense the surrounding environment or the obstacle. The radar device of embodiments of the present disclosure may be a laser radar or a microwave radar. A so-called lidar may be a radar system that emits a laser beam to detect a feature measure such as a position, a shape, and a speed of a target. The microwave radar may use a microwave ranging principle to measure the position, shape, and speed of the target. Of course, in other embodiments, those skilled in the art may also implement radar detection by using, for example, an acoustic wave, a wireless wave, etc. Regardless of the detection method used, the smaller the overall size and weight of the radar device are, the more suitable the radar device can be applied to a small system.

Figure 2:
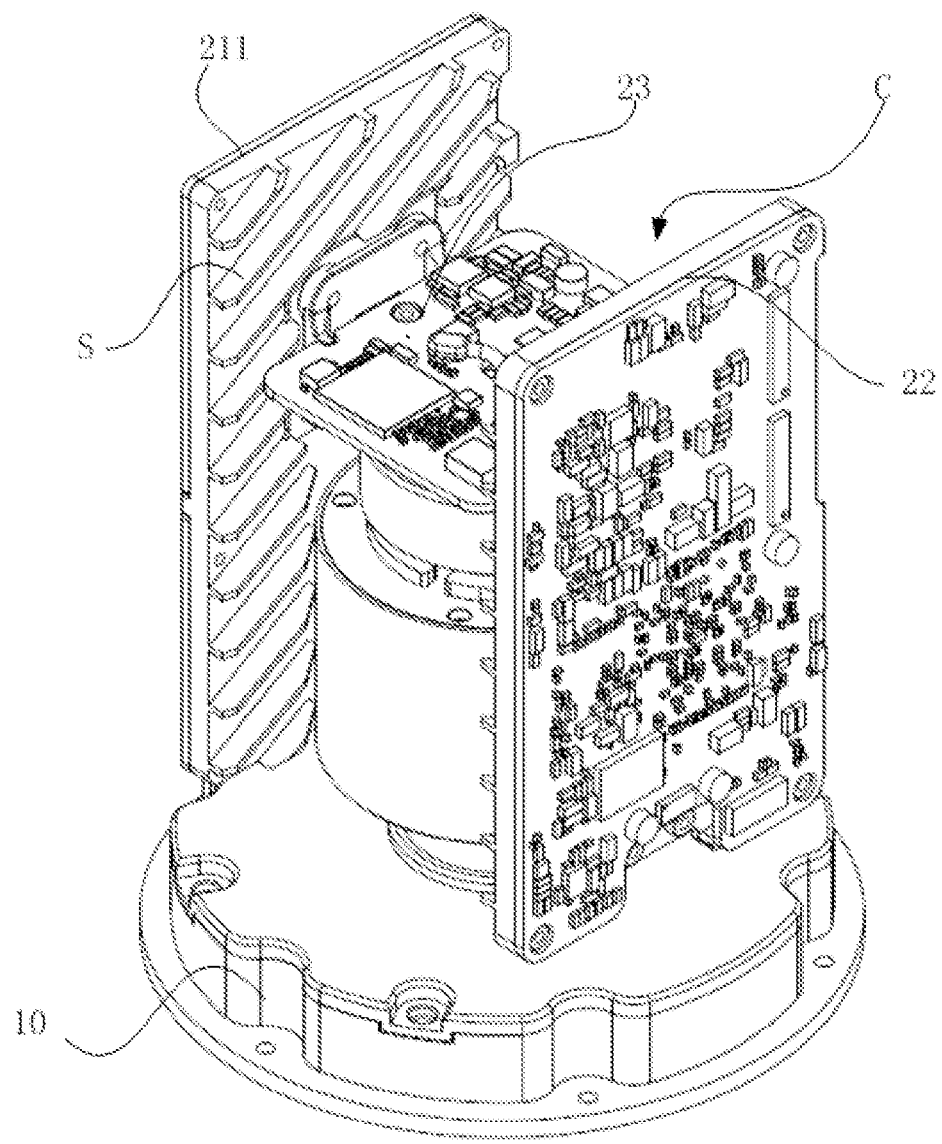
FIG. 2 is a schematic structural diagram of the radar device according to some embodiments of the present disclosure.
Figure 3:
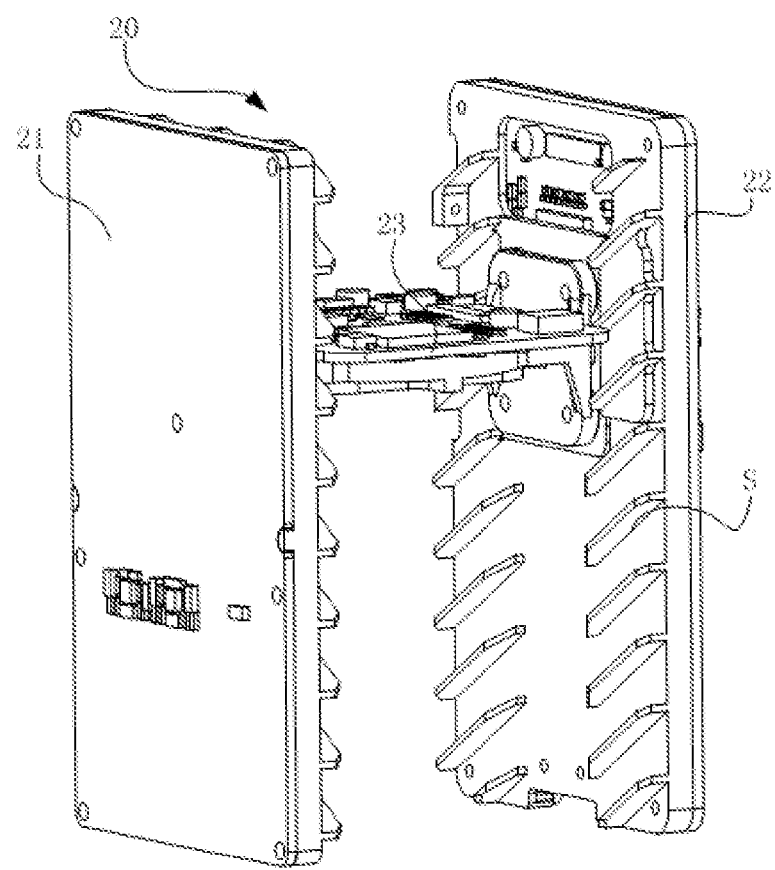
FIG. 3 is a schematic structural diagram of a radar module according to some embodiments of the present disclosure.

The radar device provided in embodiments of the present disclosure aims to solve the technical problems that the radar device of the existing technology is too large in size and in weight and is not suitable to be applied to a small system. In some embodiments, FIG. 1 is a schematic cross-sectional structural diagram of a radar device according to some embodiments of the present disclosure. FIG. 2 is a schematic structural diagram of the radar device according to some embodiments of the present disclosure. FIG. 3 is a schematic structural diagram of a radar module according to some embodiments of the present disclosure.

With reference to FIG. 1 to FIG. 3, the radar device of embodiments of the present disclosure includes a radar base 10 and a radar module 20. The radar module 20 is mounted at the radar base 10 and may rotate relative to the radar base 10 around a rotation axis. The rotation axis around which the radar module 20 rotates may be a physical rotation shaft. For example, the radar module 20 may be connected through a rotation drive device such as a motor. The radar module 20 may be connected through a drive shaft of the motor and rotate by using the drive shaft as the rotation shaft. In some other embodiments, the rotation axis around which the radar module 20 rotates may be a virtual rotation axis. For example, the radar module 20 may be connected through a mobile device. The mobile device may be slidably arranged at the radar base 10 and may rotate around a preset rotation axis. By rotatably arranging the radar module 20 at the radar base 10, the radar device may have more detection directions. When the radar module 20 may rotate 360° or greater than 360° in a circumferential direction, the radar device may realize an omnidirectional detection. No dead detection angle exists.

The radar module 20 includes an antenna assembly 21, a signal processing circuit board 22, and a rotation installation base 23. The antenna assembly 21 and the signal processing circuit board 22 may be arranged oppositely at an interval and jointly enclose to form an accommodation space C. The rotation installation base 23 may be connected to the antenna assembly 21 and the signal processing circuit board 22 and located in accommodation space C. The radar base 10 may be at least partially located in accommodation space C and arranged opposite to the rotation installation base 23.

In some embodiments, the antenna assembly 21 and the signal processing circuit board 22 being arranged opposite to each other may mean that overall structural shapes are opposite to each other but not mean that an element of the antenna assembly 21 that emits and receives a detection wave is arranged opposite to the signal processing circuit board 22. On the contrary, in order to prevent the signal processing circuit board 22 from affecting transmission and reception of the detection wave of the antenna assembly 21, the element configured to transmit and receive the detection wave at the antenna assembly 21 may be arranged facing away from the signal processing circuit board 22. Thus, on a travel path of the detection wave, the signal processing circuit board 22 may not block the detection wave, thereby ensuring scanning and detection effects of the antenna assembly 21.

The antenna assembly 21 includes an antenna plate 211 and a radiation sheet arranged at the antenna plate 211. The antenna plate 211 may be configured as a structure that supports the radiation sheet. The antenna plate 211 may be in a plate shape symmetrical to the signal processing circuit board 22. The radiation sheet may be attached to the antenna plate 211. The radiation sheet may be configured to be connected to a power supply. When the radiation sheet is powered by the power supply, the radiation sheet may emit a detection wave.

The antenna assembly 21 and the signal processing circuit board 22 may both be in the plate shape to reduce the weight and size of the entire radar device as much as possible.

In some embodiments, weights of the antenna assembly 21 and the signal processing circuit board 22 may be substantially the same. Thus, the radar module 20 may be balanced when the radar device 20 rotates. Therefore, the radar base 10 may not generate vibration or shaking, so the stability of the entire radar device may be relatively good. In addition, when the radar device is in a stable state, the ranging of the detection wave may be more accurate, and a detection precision may be higher.

In addition, the antenna assembly 21 and the signal processing circuit board 22 may be substantially parallel to each other to reduce the overall size of the radar device as much as possible while ensuring that reasonable accommodation space C is formed between the antenna assembly 21 and the signal processing circuit board 22. Further, both the antenna assembly 21 and the signal processing circuit board 22 may be parallel to the rotation axis, around which the radar module 20 rotates. The radar base 10 may be in a flat shape to support the radar module 20 stably. The rotation axis may be perpendicular to the radar base 10. Thus, when the radar module 20 rotates, the radar module 20 may maintain a distance to the radar base 10 unchanged at various rotation angles.

The rotation installation base 23 may be parallel to the radar base 10. The rotation installation base 23 may be located at a position near the top of the antenna assembly 21 and the signal processing circuit board 22. As such, the antenna assembly 21, the rotation installation base 23, the signal processing circuit board 22, and the radar base 10 may form a large enough accommodation space to accommodate and mount other elements. For example, a drive device is provided for driving the radar module 20 to rotate. The drive device may be accommodated in the accommodation space among the antenna assembly 21, the rotation installation base 23, the signal processing circuit board 22, and the radar base 10. The overall structure may be compact, and the layout is reasonable, which can effectively save the space.

The radar base 10 may be entirely located in accommodation space C or partly located in accommodation space C. When the radar base 10 is entirely accommodated in accommodation space C, a maximum lateral dimension of the radar base 10 may be smaller than a lateral dimension of accommodation space C. When the radar base 10 is partially located in accommodation space C, a lateral dimension of the radar base 10 accommodated in accommodation space C may be smaller than the lateral dimension of accommodation space C. The maximum lateral dimension of the radar base 10 outside accommodation space C may be larger than, smaller than, or equal to the lateral dimension of accommodation space C, which is not limited here. In some embodiments, a maximum cross-sectional dimension of the radar base 10 may be larger than the lateral dimension of the radar module 20. As such, an orthographic projection of the radar module 20 may be completely located at the radar base 10. The weight of the radar module 20 may be entirely carried by the radar base 10, thereby effectively improving the structural stability of the radar device.

Figure 4:
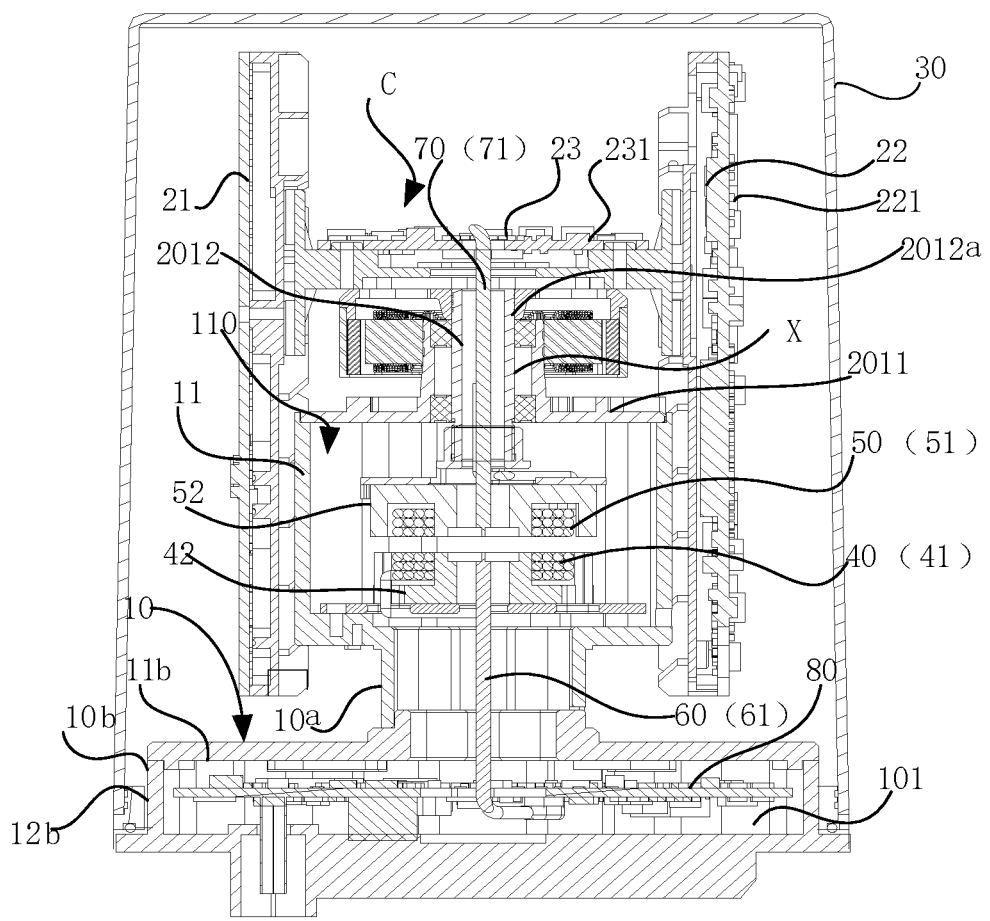
FIG. 4 is a schematic cross-sectional structural diagram of the radar device with a radar cover according to some embodiments of the present disclosure.

In some embodiments, as shown in FIG. 1 and FIG. 4, the radar base 10 includes an upper base 10a and a lower base 10b. The upper base 10a may extend into accommodation space C. The lower base 10b may be located under the radar module 20.

When the radar base 10 is entirely accommodated in accommodation space C, a lateral dimension of the surface supported by the radar base 10 may be smaller than the lateral dimension of the accommodation space C. As such, the surface supported by radar base 10 may be prevented from interfering the radar module 20 when the radar module 20 rotates.

Figure 5:
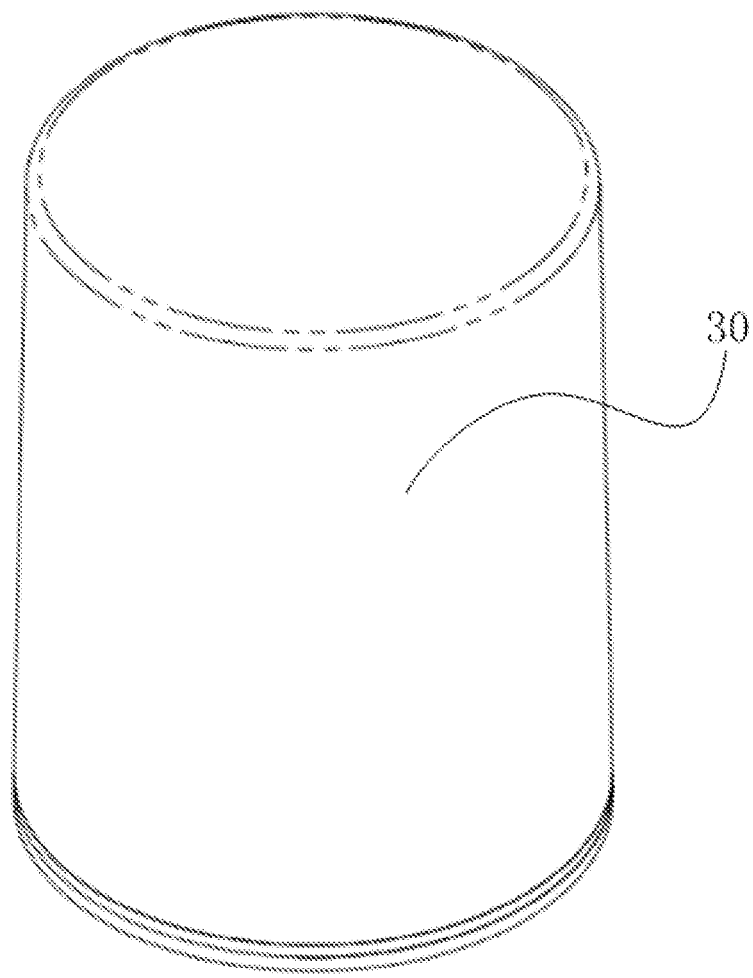
FIG. 5 is a schematic structural diagram showing the radar cover of the radar device according to some embodiments of the present disclosure.

FIG. 4 is a schematic cross-sectional structural diagram of the radar device with a radar cover according to embodiments of the present disclosure. FIG. 5 is a schematic structural diagram showing the radar cover of the radar device according to some embodiments of the present disclosure. As shown in FIG. 4 and FIG. 5, the radar device of embodiments of the present disclosure further includes a radar cover 30. The radar cover 30 is arranged at the radar base 10. The radar cover 30 may cooperate with the radar base 10 to enclose to form a space for accommodating the radar module 20. The radar cover 30 may be cylindrical. An axis of the rotation axis of the radar module 20 may coincide with an axis of the cylindrical radar cover 30. As such, a size of the radar cover 30 may be reduced as much as possible while the radar cover 30 is ensured not to interfere with the radar module 20.

By arranging the radar cover 30, the radar module 20 may be protected to prevent the external environment from interfering with the radar module 20. In some embodiments, for example, external water vapor, dust, etc., can be prevented from being contaminated on the radar module 20 and affecting the sensitivity of the radar module 20. In addition, the radar cover 30 may also effectively protect the radar module 20 from collisions with external objects to damage the radar module 20. In order to ensure a normal operation of the radar device, the radar cover 30 should be made of a material that can allow the radar detection wave to pass through, for example, made of a glass fiber composite material. With the radar cover 30, a service life of the radar device may be effectively extended.

When the overall size of the radar device is more compact due to the arrangement, some members of the radar device, such as the radar cover 30, may be made smaller with the same material, which may effectively reduce the weight of the radar device.

The radar device of embodiments of the present disclosure may include the radar base and the radar module. The radar module may be rotatably mounted at the radar base. The radar module may include the antenna assembly and the signal processing circuit board arranged oppositely at an interval. The antenna assembly and the signal processing circuit board may jointly enclose to form an accommodation space. The rotation installation base may be connected to the antenna assembly and the signal processing circuit board and located in the accommodation space. The radar base may be at least partially located in the accommodation space and arranged opposite to the rotation installation base. By designing a structure with the antenna assembly and the signal processing circuit board of the radar module arranged oppositely at an interval on two sides and accommodating the radar base at least partially in the accommodation space of the radar module, a vertical space may be effectively saved, a space stacking may be reduced, and the structure may be compact. Compared with the existing technology that the radar device adopts a technical solution of vertical stacking, the technical solution of embodiments of the present disclosure may reduce the overall size of the radar device and reduce the weight of the radar device. In embodiments of the present disclosure, the radar device is provided.

In some embodiments, a power supply and signal transmission method of the radar device and a layout of electronic devices of the radar device are described. The radar module may need to exchange signals with an external apparatus and be stably powered to implement parameter control and signal transmission of the radar module 20. However, the radar module 20 may constantly rotate during operation, and the external apparatus may be in a fixed position. How to ensure that the radar module 20 can maintain the stable power supply and signal transmission with the external apparatus during rotation and operation is a problem to be solved in embodiments of the present disclosure.

As shown in FIG. 1 or FIG. 4, the radar device of embodiments of the present disclosure further includes a wireless power transmission assembly 40 and a wireless power reception assembly 50. The wireless power transmission assembly 40 may be provided at the radar base 10. The wireless power reception assembly 50 may be provided at the radar module 20. The wireless power transmission assembly 40 and the wireless power reception assembly 50 may be wirelessly connected to power the radar module 20. The wireless power transmission assembly 40 may be connected to an external power source through a cable and powered by the power source, while the wireless power reception assembly 50 is wirelessly connected to the wireless power transmission assembly 40 to transmit electrical power. As such, the radar module 20 may be continuously powered even when rotating, and the rotation of the radar module 20 may not be affected.

In other embodiments, the wireless power transmission assembly 40 may be connected to the power supply in a wireless manner. In this case, the wireless power transmission assembly 40 may also rotate with the rotation of the radar module 20, which is not limited here.

In some embodiments, the wireless power transmission assembly 40 includes a first wireless coil 41. The wireless power reception assembly 50 includes a second wireless coil 51. The first wireless coil 41 may be coupled to the second wireless coil 51. The first wireless coil 41 and the second wireless coil 51 may be charged through electromagnetic induction between the first wireless coil 41 and the second wireless coil 51. The electrical power may be transmitted between the first wireless coil 41 and the second wireless coil 51. When an alternating current passes through the first wireless coil 41, an alternating magnetic flux may be generated between the first wireless coil 41 and the second wireless coil 51. Thus, an induction voltage varying with the magnetic flux may be generated in the second wireless coil 51 to generate a current.

In other embodiments, the wireless power transmission assembly 40 and the wireless power reception assembly 50 may transmit the electrical power in a magnetic resonance method and a microwave method.

In some embodiments, both axes of the first wireless coil 41 and the second wireless coil 51 may substantially coincide with the rotation axis of the radar module 20. Thus, when the first wireless coil 41 is fixed, and the second wireless coil 51 rotates with the rotation of the radar module 20, the axis of the second wireless coil 51 and the axis of the first wireless coil 41 may be coaxial at all times. The rotation of the radar module 20 may not affect a coupling state between the first wireless coil 41 and the second wireless coil 51. A continuously and stable power supply may exist between the first wireless coil 41 and the second wireless coil 51.

In some embodiments, the wireless power transmission assembly 40 further includes a first coil bracket 42. The first wireless coil 41 may be fixed at the first coil bracket 42. The wireless power reception assembly 50 further includes a second coil bracket 52. The second wireless coil 51 may be fixed at the second coil bracket 52. The first wireless coil 41 may be located on a side of the first coil bracket 42 facing the wireless power reception assembly 50. The second wireless coil 51 may be located on a side of the second coil bracket 52 facing the wireless power transmission assembly 40. Thus, a distance between the first wireless coil 41 and the second wireless coil 51 may be relatively small, the electromagnetic induction between the first wireless coil 41 and the second wireless coil 51 may not be affected by other members, and the transmission effect may be good.

The radar device provided by embodiments of the present disclosure further includes a first signal assembly 60 and a second signal assembly 70. The first signal assembly 60 may be arranged at the radar base 10 and communicatively connected to an external apparatus. The second signal assembly 70 may be arranged at the radar module 20. The first signal assembly 60 and the second signal assembly 70 may be wirelessly connected to establish a wireless communication connection between the radar module 20 and the external apparatus. The first signal assembly 60 may be connected to the external apparatus through a cable or wirelessly to receive a control signal of the external apparatus. The radar module 20 may communicate with the external apparatus through the first signal assembly 60 and the second signal assembly 70 to connect the external device to transmit the control signal of the external apparatus to the radar module 20 and transmit a radar data signal of the radar module 20 to the external apparatus. Thus, the signal transmission between the external apparatus and the radar module 20 may be realized. The control signal of the external apparatus may be transmitted to the radar module 20 to control the radar module 20. The radar data signal of the radar module 20 may be transmitted to the external apparatus.

The first signal assembly 60 includes a first transmission antenna 61. The second signal assembly 70 includes a second transmission antenna 71. The first transmission antenna 61 may be coupled to the second transmission antenna 71. The first transmission antenna 61 and the second transmission antenna 71 may be linear. Axes of the first transmission antenna 61 and the second transmission antenna 71 may substantially coincide with the rotation axis of the radar module 20. As such, when the second transmission antenna 71 follows the radar module 20 to rotate, a relative position of the first transmission antenna 61 and the second transmission antenna 71 may not change. The first transmission antenna 61 and the second transmission antenna 71 may always maintain a stable coupled state. The rotation of the radar module 20 may not affect the communication between the radar module 20 and the external apparatus.

In other embodiments, wireless transmission between the first signal assembly 60 and the second signal assembly 70 may be implemented through WiFi, Bluetooth, etc.

In other embodiments, when requirement for a detection range of the radar device is not high, the power supply and signal transmission of the radar module 20 may also use a wired transmission method. A wiring path of a power supply cable and a signal transmission cable of the radar module 20 may substantially coincide with the axis of the rotation shaft of the radar module 20. Thus, when the radar module 20 rotates, the cables may not generate an excessive twist, and wire disturbance may be relatively small, which may not have a big impact on the power supply and the signal transmission of the radar module 20.

In addition, the radar base 10 is provided with a base circuit module 80 configured to be electrically connected to the external apparatus. In some embodiments, an accommodation chamber 101 is formed in the radar base 10. The base circuit module 80 may be arranged in the accommodation chamber 101 to further save space. The wireless power transmission assembly 40 and the first signal assembly 60 may be electrically connected to the base circuit module 80. The base circuit module 80 may supply power to any device in the radar device that needs to be powered. For example, the base circuit module 80 may also supply power to the drive device such as the motor that drives the radar module 20 to rotate. When the radar base 10 has the upper base 10a and the lower base 10b, the lower base 10b may include a top cover 11b and a base body 12b that are detachably connected to each other. The top cover 11b and the base body 12b may enclose to form the accommodation chamber 101. The base circuit module 80 may be located in the accommodation chamber 101, the top cover 11b may be detached from the base body 12b to expose the base circuit module 80, which may facilitate replacement or maintenance of devices of the base circuit module 80. The base circuit module 80 may have good flexibility.

In some embodiments, the radar device further includes a signal transmission module 231 and a signal processing module 221. The signal transmission module 231 may be electrically connected to the antenna assembly 21, the signal processing module 221, the wireless power reception assembly 50, and the second signal assembly 70. The signal transmission module 231 may receive the radar data signal of the radar module 20 and send the radar data signal and/or the control signal of the external apparatus to the signal processing module 231 for processing. The signal transmission module 231 may be powered by the wireless power reception assembly 50. The signal transmission module 231 may transmit the control signal of the external apparatus through the second signal assembly 70. In some embodiments, the wireless power reception assembly 50 may be electrically connected to an end of the second signal assembly 70. Another end of the second signal assembly 70 may be electrically connected to the signal transmission module 231. The signal transmission module 231 may be electrically connected to the signal processing module 221.

In some embodiments, the signal transmission module 231 may be arranged at the rotation installation base 30. The signal processing module 231 may be arranged at the signal processing circuit board 22. In order to ensure the balance of the radar module 20 to cause the force of the radar module 20 to be balanced during rotation, the weight of the signal processing circuit board 22 may be equal to the weight of the antenna assembly 21. Thus, the size of the signal processing circuit board 22 may be also limited. The signal transmission module 231 and the signal processing module 221 cannot be arranged together in the limited space of the signal processing circuit board 22. Therefore, the signal transmission module 231 may be arranged in the rotation installation base 23 connected between the antenna assembly 21 and the signal processing circuit board 22. Such a layout is reasonable and can effectively save space. The overall size of the radar device may be reduced.

In some embodiments, the motor is further provided and configured to drive the radar module 20 to rotate. The motor includes a stator 2011 and a rotor 2012 rotatable relative to the stator 2011. The radar module 20 may be fixedly connected to the rotor 2012. The stator 2011 may be fixed to the radar base 10. The rotor 2012 may rotate synchronously with the rotation shaft. When the motor drives, the rotor 2012 may continuously rotate to drive the radar module 20 to rotate. In some embodiments, the rotor 2012 of the motor may be controlled to rotate clockwise or counterclockwise to control the radar module 20 to rotate clockwise or counterclockwise. When the rotation angle is greater than or equal to 360°, the omnidirectional multi-angle detection may be realized.

A housing 11 may be arranged at an upper portion of the radar base 10. The stator 2011 may be fixed to the housing 11. Both wireless power transmission assembly 40 and wireless power reception assembly 50 may be located in the housing 11. The wireless power transmission assembly 40 may be fixed to the housing 11. The wireless power reception assembly 50 may be fixedly connected to the rotor 2012. Therefore, when the rotor 2012 rotates, the rotor 2012 drives the wireless power reception assembly 50 to rotate. The wireless power transmission assembly 40 and the wireless power reception assembly 50 may be arranged in the housing 11. An inner chamber 110 may be formed in the housing 11. The wireless power transmission assembly 40 and the wireless power reception assembly 50 may be arranged in the inner chamber 110. The housing 11 may protect the wireless power transmission assembly 40 and the wireless power reception assembly 50 to prevent the radar module 20 from affecting the wireless power transmission assembly 40 and the wireless power reception assembly 50 during rotation.

A top of the housing 11 may have an opening. The stator 2011 may be fixed to the top of the housing 11 and block the top opening. The stator 2011 may be detachably connected to the top opening of the housing 11. The stator 2011 may seal the housing 11 to prevent dust and water vapor from entering the wireless power transmission assembly 40 and the wireless power reception assembly 50 to affect the power transmission between the wireless power transmission assembly 40 and the wireless power reception assembly 50 or damage wireless power transmission assembly 40 and the wireless power reception assembly 50. A sealed chamber may be formed inside the housing 11. The stator 2011 may be fixedly connected to the housing 11. The wireless power transmission assembly 40 and the wireless power reception assembly 50 may be arranged in the inner chamber 110, which is not limited here.

The rotor 2012 may be located above the housing 11 and fixed under the rotation installation base 23. The layout may be compact and reasonable. The distance among the rotor 2012, the rotation installation base 23, and the housing 11 may be as small as possible to cause the structure to be as compact as possible.

The rotor 2012 may be fixedly provided with a rotor bracket 2012a. The rotor bracket 2012a may extend into the housing 11. The wireless power reception assembly 50 may be arranged at the rotor bracket 2012a. The rotor bracket 2012a may extend into the housing 11 and be fixedly connected to the second coil bracket 52 through the rotor bracket 2012a. When the rotor 2012 rotates, the rotor bracket 2012a may drive the second coil bracket 52 and the second wireless coil 51 connected to the rotor bracket 2012a to rotate.

The rotor support 2012a may include a hollow rotor shaft X. The second signal assembly 70 may be arranged in the hollow rotor shaft X. The stator 2011 may be sleeved at the outside of one end of the hollow rotor shaft X. Thus, the hollow rotor shaft X may extend into the inner chamber 110 of the housing 11. The axis of the second signal assembly 70 may coincide with an axis of the hollow rotor shaft X. By arranging the second signal assembly 70 in the hollow rotor shaft X, on one hand, the second signal assembly 70 can be protected, and on another hand, space can be effectively saved to realize a reasonable layout. Furthermore, it is beneficial to ensure the axis of the second signal assembly 70 to coincide with the axis of the hollow rotor shaft X. As such, when the radar module 20 rotates, the wireless communication connection between the first signal assembly 60 and the second signal assembly 70 may not be affected. Based on above, in some embodiments, as shown in FIG. 2, a plurality of blades S are distributed and arranged at a first sidewall of the antenna plate 211 and/or at a second sidewall of the signal processing circuit board 22. The plurality of blades S may be configured to cut the air to accelerate the air to flow to form a heat dissipation airflow when the radar module 20 rotates. The first sidewall may be arranged opposite to the second sidewall.

The first sidewall may be a side of the antenna assembly 21 facing away from the radiation sheet. By arranging the blades S, when the radar module 20 rotates, the plurality of blades S may form a heat dissipation airflow similar to a fan to accelerate the airflow and dissipate the heat of the radar module 20. Thus, the heat dissipation effect of the radar device may be effectively improved, and the service life of the radar device may be improved.

The blades S may be arranged inclined from top to bottom. An inclination angle of each blade S may be same or different. An inclination direction of each blade may be generally inclined from top to bottom. Thus, when the radar module 20 rotates, a vertically rising heat dissipation airflow can be generated. When the airflow flows upward, members such as the radar base 10 may not block the airflow. Thus, the heat dissipation effect may be further improved. In some embodiments, a mobile platform is provided. The mobile platform of embodiments of the present disclosure may include an unmanned aerial vehicle (UAV), an automobile, and another mobile apparatus. In some embodiments, the mobile platform may include a body and a radar device arranged at the body. The radar device may include the radar base 10 and the radar module 20.

The mobile platform as the UAV may be taken as an example. The UAV may generally include a body and an arm. The antenna assembly 21 of the radar device may be arranged at the body facing away from the body to prevent the body from blocking the detection wave emitted by the antenna assembly 21. In some embodiments, the radar device may also be arranged at the arm. The radar device may be arranged according to specific needs, which is not limited here.

The radar module 20 may be mounted at the radar base 10 and rotate relative to the radar base 10 around a rotation axis. The rotation axis around which the radar module 20 rotates may be a physical rotation shaft. For example, the radar module 20 may be connected through a rotation drive device such as a motor. The radar module 20 may be connected by a drive shaft of the motor and rotate around the drive shaft by using the drive shaft as the rotation shaft. In some other embodiments, the rotation axis around which the radar module 20 rotates may be a virtual rotation shaft. For example, the radar module 20 can be connected through a mobile device. The mobile device may be slidably arranged at the radar base 10 and rotate around a preset rotation axis. By rotatably arranging the radar module 20 at the radar base 10, the radar device may have more detection directions. When the radar module 20 rotates 360° or greater than 360° in the circumferential direction, the radar device may realize the omnidirectional detection, and no dead detection angle may exist.

The radar module 20 may include the antenna assembly 21, the signal processing circuit board 22, and the rotation installation base 23. The antenna assembly 21 and the signal processing circuit board 22 may be arranged oppositely at an interval and jointly enclose to form accommodation space C. The rotation installation base 23 may be connected to the antenna assembly 21 and the signal processing circuit board 22 are located in accommodation space C. The radar base 10 may be at least partially located in accommodation space C and arranged opposite to the rotation installation base 23.

The structure and function of the radar device in the mobile platform of embodiments of the present disclosure may be the same as those of embodiment one. For details, reference may be made to the above description, which is not repeated here.

The mobile platform of embodiments of the present disclosure may include a radar device. The radar device may include the radar base and the radar module. The radar module may be rotatably mounted at the radar base. The radar module may include the antenna assembly and the signal processing circuit board that are arranged oppositely at an interval. The antenna assembly and the signal processing circuit board may jointly enclose to form an accommodation space. The rotation installation base may be connected to the antenna assembly and the signal processing circuit board and located in the accommodation space. The radar base may be at least partially located in the accommodation space and arranged opposite to the rotation installation base. By designing a structure with the antenna assembly and signal the processing circuit board of the radar module arranged oppositely at an interval on two sides and accommodating the radar base at least partially in the accommodation space of the radar module, the vertical space may be effectively saved, a space stacking may be reduced, and the structure may be compact. Compared with the technical solution of the existing technology that the radar device is stacked vertically, the technical solution of embodiments of the present disclosure may reduce the overall size of the radar device and reduce the weight of the radar device. Thus, the overall weight of the mobile platform may be reduced. Especially, when the mobile platform is the UAV, the weight of the UAV may be effectively reduced to improve the lightweight degree of the UAV to satisfy the requirement of the small UAV.

In embodiments of the present disclosure, the displayed or discussed mutual coupling, direct coupling, or communication connection may be indirect coupling or communication connection through some interfaces, devices, or units and may be electrical, mechanical, or another form.

Finally, the above embodiments are only used to illustrate the technical solutions of the present disclosure, not to limit the technical solutions. Although the present disclosure has been described in detail with reference to the foregoing embodiments, those of ordinary skill in the art should understand that modifications may still be made to the technical solutions recorded in the foregoing embodiments, or equivalent replacements may be performed on some or all of the technical features. These modifications or replacements do not make the essence of the corresponding technical solutions depart from the scope of the technical solutions of embodiments of the present disclosure.

What is claimed is:

1. A radar device comprising:
    a radar base;
    a radar module mounted at the radar base and configured to rotate relative to the radar base around a rotation axis, the radar module including:
        an antenna assembly;
        a signal processing circuit board, the antenna assembly and the signal processing circuit board being arranged oppositely at an interval and jointly enclosing to form an accommodation space; and
        a rotation installation base connected to the antenna assembly and the signal processing circuit board, and located in the accommodation space, rotation of the rotation installation base driving the antenna assembly and the signal processing circuit board to rotate around the rotation axis;
    a first signal assembly arranged at the radar base; and
    a second signal assembly arranged at the radar module;
    wherein:
        the radar base is at least partially located in the accommodation space and arranged opposite to the rotation installation base;
        wherein the first signal assembly is configured to be communicatively connected to an external apparatus; and
        the first signal assembly and the second signal assembly are configured to be wirelessly connected to each other to establish a wireless communication connection between the radar module and the external apparatus.

2. The radar device of claim 1, wherein the antenna assembly and the signal processing circuit board have a substantially same weight.

3. The radar device of claim 1, wherein the antenna assembly includes an antenna plate and a radiation sheet arranged at the antenna plate.

4. The radar device of claim 3, wherein the antenna plate is substantially parallel to the signal processing circuit board.

5. The radar device of claim 1, further comprising:
    a wireless power transmission assembly arranged at the radar base; and
    a wireless power reception assembly arranged at the radar module;
    wherein the wireless power transmission assembly is wirelessly connected to the wireless power reception assembly to supply power to the radar module.

6. The radar device of claim 5, wherein:
the wireless power transmission assembly includes a first wireless coil;
the wireless power reception assembly includes a second wireless coil; and
the first wireless coil is coupled to the second wireless coil.

7. The radar device of claim 6, wherein axes of the first wireless coil and the second wireless coil substantially coincide with the rotation axis of the radar module.

8. The radar device of claim 6, further comprising:
a motor including a stator and a rotor rotatable relative to the stator, the radar module being fixedly connected to the rotor, and the stator being fixed to the radar base.

9. The radar device of claim 8, wherein the rotor rotates synchronously with a rotation shaft.

10. The radar device of claim 8, wherein:
a housing is arranged at an upper portion of the radar base;
the stator is fixed to the housing;
the wireless power transmission assembly and the wireless power reception assembly are located in the housing;
the wireless power transmission assembly is fixedly connected to the housing; and
the wireless power reception assembly is fixedly connected to the rotor.

11. The radar device of claim 10, wherein the rotor is located above the housing and fixed under the rotation installation base.

12. The radar device of claim 8, wherein:
the rotor includes a rotor bracket that includes a hollow rotor shaft; and
the second signal assembly is arranged in the hollow rotor shaft.

13. The radar device of claim 1, wherein:
the first signal assembly includes a first transmission antenna;
the second signal assembly includes a second transmission antenna; and
the first transmission antenna is configured to be coupled to the second transmission antenna.

14. The radar device of claim 13, wherein:
the first transmission antenna and the second transmission antenna are linear; and
axes of the first transmission antenna and the second transmission antenna substantially coincide with the rotation axis of the radar module.

15. The radar device of claim 1, further comprising:
a signal transmission module and a signal processing module;
wherein the signal transmission module is electrically connected to the antenna assembly, the signal processing module, the wireless power reception assembly, and the second signal assembly.

16. The radar device of claim 15, wherein the signal processing module is arranged at the signal processing circuit board or the rotation installation base.

17. The radar device of claim 1, wherein a maximum cross-sectional dimension of the radar base is larger than a lateral dimension of the radar module.

18. A radar device comprising:
a radar base;
a radar module mounted at the radar base and configured to rotate relative to the radar base around a rotation axis; and
a motor including a stator and a rotor rotatable relative to the stator, the radar module being fixedly connected to the rotor;
wherein:
a housing is arranged at an upper portion of the radar base;
the stator is fixed to the housing;
a wireless power transmission assembly and a wireless power reception assembly are located in the housing;
the wireless power transmission assembly is fixedly connected to the housing;
the wireless power reception assembly is fixedly connected to the rotor; and
the wireless power transmission assembly is wirelessly connected to the wireless power reception assembly to supply power to the radar module.

19. A radar device comprising:
a radar base;
a radar module mounted at the radar base and configured to rotate relative to the radar base around a rotation axis, the radar module including:
an antenna assembly;
a signal processing circuit board; and
a rotation installation base connected to the antenna assembly and the signal processing circuit board, rotation of the rotation installation base driving the antenna assembly and the signal processing circuit board to rotate around the rotation axis;
a first signal assembly arranged at the radar base; and
a second signal assembly arranged at the radar module;
wherein the first signal assembly is configured to be communicatively connected to an external apparatus; and
wherein the first signal assembly and the second signal assembly are configured to be wirelessly connected to each other to establish a wireless communication connection between the radar module and the external apparatus.

* * * * *